UNITED STATES PATENT OFFICE.

CARL G. STEBBINS AND ALBERT GELOW, OF THREE OAKS, MICHIGAN, ASSIGNORS TO THE WARREN FEATHERBONE COMPANY, OF THREE OAKS, MICHIGAN, A CORPORATION OF MICHIGAN.

PROCESS OF TREATING KERATIN BODIES.

1,219,787.     Specification of Letters Patent.     Patented Mar. 20, 1917.

No Drawing.     Application filed April 12, 1915. Serial No. 20,706.

*To all whom it may concern:*

Be it known that we, CARL G. STEBBINS and ALBERT GELOW, citizens of the United States, residing in the town of Three Oaks, county of Berrien, State of Michigan, have invented certain new and useful Improvements in Processes of Treating Keratin Bodies, of which the following is a specification.

Our invention relates particularly to a process of treating horny substances belonging to a group of bodies known in chemistry as keratin. The invention is particularly applicable for treating the quills of turkeys, or other fowls used in the manufacture of boning or stiffening material employed largely in apparel for women.

In the manufacture of such articles that are made from keratin bodies such as turkey quills, the quills are split or shredded longitudinally into filaments or fibers, which are then bound together into suitable form. When so bound a resilient structure is obtained, adapted for many uses in apparel for women.

It has been found, however, in structures composed of keratin bodies, and particularly when such bodies have been reduced to filament form, that the alternate action of moisture and heat produces chemical changes. These chemical changes are due, largely, to the bacteria which have been introduced by moisture and heat as these bacteria propagate rapidly in any substance that is nitrogenous in character. Such nitrogenous soil is present in keratin bodies such as quills which, as a natural consequence, furnish an ideal medium for the growth of bacteria.

Where the article constructed from keratin bodies is used in apparel for women, and since such apparel is not only subjected to the moisture and heat of the body but must be washed and ironed as well with the keratin bodies attached to it, the physical properties of such article are impaired in a very short time by the chemical changes which take place and as a consequence the article loses its resiliency and thereafter becomes useless.

The present invention, therefore, seeks to preserve the physical properties of the keratin bodies from which such articles are made for the purpose of retaining the natural resiliency therein and arresting chemical changes to thereby prevent decay.

In the manufacture of the resilient blades or other resilient articles from the quills of fowls, the quills are, as heretofore stated, split or shredded longitudinally and thus expose a certain amount of cellular structure contained between the inner and outer hornified surfaces of the quill. These filaments or fibers produced by splitting or shredding are then bound together with thread and after being reduced to proper form, both as to width and length, are then immersed in a water-proofing substance which permeates between the filaments surrounding the individual filaments and entering the interstices or cavities of the individual filaments, as well as coating the same. The water-proofing substance may be composed of various materials, it being essential, however, that it have sufficient flexibility, when dry, to accommodate itself to the bending movements of the structure. As such water-proof substances are well known in the art we do not deem it necessary to further describe the same.

While we prefer to apply the water-proofing substance directly to the keratin bodies, we find, however, that the process may be practised at less cost by first immersing the keratin bodies in a sizing or glue to fill the interstices and to be absorbed by such matter in the keratin bodies as may have absorptive properties, whereupon the article is heated to a sufficiently high degree in order to destroy any bacterial action as well as evaporate all moisture, whereupon the article is thereafter immersed in a water-proof substance. This process requires the use of less water-proof substance and can be practised at a less cost on account of sizing being cheaper than a serviceable waterproof substance.

Having now described the process employed by us—

We claim:

1. The herein described process of treating keratin bodies consisting of shredding said bodies to form filaments, subjecting such filaments to a sufficiently high degree of heat to destroy bacterial action and evaporate moisture therein, and then immersing said filaments in an elastic water-proofing substance whereby the interstices of the filaments are filled, thereby preventing bacteria from attacking nitrogenous matter in the keratin.

2. The herein described process of treating keratin bodies consisting of shredding said bodies to form filaments, sizing the same to fill the interstices in the keratin bodies having absorptive properties, subjecting said filaments to a sufficiently high temperature to destroy bacterial action and evaporate all moisture therein, and then immersing said filaments in an elastic water-proofing substance.

CARL G. STEBBINS.
ALBERT GELOW.

Witnesses:
MORRIS G. McGAWN,
MAUDE E. WARREN.

Copies of this patent may be obtained for five cents each, by addressing the "Commissioner of Patents, Washington, D. C."